US009950635B1

(12) United States Patent
Trego

(10) Patent No.: US 9,950,635 B1
(45) Date of Patent: Apr. 24, 2018

(54) ELECTRIFIED VEHICLE HAVING A CHARGING PORT LOCK CONNECTED TO A MANUAL RELEASE CABLE

(71) Applicant: FORD GLOBAL TECHNOLOGIES, LLC, Dearborn, MI (US)

(72) Inventor: William Christopher Trego, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/597,785

(22) Filed: May 17, 2017

(51) Int. Cl.
| H01R 13/627 | (2006.01) |
| B60L 11/18 | (2006.01) |
| F16C 1/10 | (2006.01) |
| B60R 16/02 | (2006.01) |
| E05B 83/34 | (2014.01) |
| E05C 1/12 | (2006.01) |
| H01R 13/447 | (2006.01) |
| H01R 13/639 | (2006.01) |
| B60K 6/365 | (2007.10) |
| B60K 6/40 | (2007.10) |

(52) U.S. Cl.
CPC ...... *B60L 11/1818* (2013.01); *B60R 16/0207* (2013.01); *E05B 83/34* (2013.01); *E05C 1/12* (2013.01); *F16C 1/10* (2013.01); *H01R 13/447* (2013.01); *H01R 13/6275* (2013.01); *H01R 13/6397* (2013.01); *B60K 6/365* (2013.01); *B60K 6/40* (2013.01); *B60Y 2200/92* (2013.01); *B60Y 2400/73* (2013.01); *Y10S 903/91* (2013.01); *Y10S 903/951* (2013.01)

(58) Field of Classification Search
CPC ............ H01R 2201/26; H01R 13/6397; H01R 33/97; H01R 13/629; H01R 13/6271; H01R 13/6275
USPC .................................. 439/34, 304, 310, 352
See application file for complete search history.

(56) References Cited

U.S. PATENT DOCUMENTS

| 8,075,329 | B1 | 12/2011 | Janarthanam et al. | |
| 8,172,599 | B2 | 5/2012 | Konchan | |
| 8,550,833 | B2 | 10/2013 | Martin | |
| 8,690,591 | B2* | 4/2014 | Charnesky | .......... B60L 11/1818 191/12.4 |
| 8,712,648 | B2 | 4/2014 | Charnesky | |
| 9,533,586 | B2* | 1/2017 | Kahara | ............... B60L 11/1818 |
| 2011/0287649 | A1 | 11/2011 | Kurumizawa et al. | |
| 2012/0088382 | A1* | 4/2012 | Konchan | ............. B60L 11/1818 439/153 |
| 2012/0313580 | A1 | 12/2012 | Charnesky et al. | |

FOREIGN PATENT DOCUMENTS

WO    WO2011002770 A1    1/2011

* cited by examiner

*Primary Examiner* — Chandrika Prasad
(74) *Attorney, Agent, or Firm* — Carlson, Gaskey & Olds P.C.

(57) ABSTRACT

An electrified vehicle according to a non-limiting aspect of the present disclosure includes, among other things, a charging port including a lock, an electrical harness electrically coupled to the charging port, a battery assembly electrically coupled to the charging port by the electrical harness, and a manual release cable connected to the lock and routed along the electrical harness. This disclosure also relates to a method.

20 Claims, 5 Drawing Sheets

US 9,950,635 B1

ELECTRIFIED VEHICLE HAVING A CHARGING PORT LOCK CONNECTED TO A MANUAL RELEASE CABLE

BACKGROUND

This disclosure relates to a charging port for an electrified vehicle. In particular, this disclosure relates to a manual release for a charging port lock.

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

Charging a battery assembly of an electrified vehicle, such as a plug-in hybrid electric vehicle (PHEV) or battery electric vehicle (BEV), can involve electrically coupling the electrified vehicle to an external power source. Electrified vehicles typically include a charging port configured to receive a plug, which is electrically coupled to the external power source. Some known charging ports include a lock configured to lock the plug to the charging port, which prevents theft of the plug, and unintended separation of the charging circuits while the vehicle is charging.

SUMMARY

An electrified vehicle according to a non-limiting aspect of the present disclosure includes, among other things, a charging port including a lock, an electrical harness electrically coupled to the charging port, a battery assembly electrically coupled to the charging port by the electrical harness, and a manual release cable connected to the lock and routed at least partially within the electrical harness.

In a further non-limiting embodiment of the foregoing electrified vehicle, the lock includes an actuator and a manual release, and the manual release cable is connected to the manual release.

In a further non-limiting embodiment of any of the foregoing electrified vehicles, the actuator is configured to move a pin between a lock position and a release position when the lock is in a normal operating condition, and the manual release is configured to move the pin to the release position when the lock is in a stuck on plug condition.

In a further non-limiting embodiment of any of the foregoing electrified vehicles, the manual release cable includes a first end connected to the lock and a second end connected to a handle.

In a further non-limiting embodiment of any of the foregoing electrified vehicles, the handle is provided under a hood of the electrified vehicle.

In a further non-limiting embodiment of any of the foregoing electrified vehicles, the manual release cable includes an identifying tag adjacent the handle.

In a further non-limiting embodiment of any of the foregoing electrified vehicles, the handle includes a loop.

In a further non-limiting embodiment of any of the foregoing electrified vehicles, the manual release cable includes a cable within a housing, and the cable is moveable relative to the housing to transmit mechanical force.

In a further non-limiting embodiment of any of the foregoing electrified vehicles, the electrical harness includes at least one electrical wire within a housing, and the manual release cable is at least partially provided within the housing of the electrical harness.

In a further non-limiting embodiment of any of the foregoing electrified vehicles, the housing of the electrical harness includes a first port adjacent the charging port and a second port adjacent the battery assembly, a first end of the manual release cable projects from the first port, and a second end of the manual release cable projects from the second port.

In a further non-limiting embodiment of any of the foregoing electrified vehicles, the electrified vehicle further includes a charger electrically coupled to the battery assembly. The electrical harness electrically couples the charging port to the charger.

In a further non-limiting embodiment of any of the foregoing electrified vehicles, the electrified vehicle is one of a battery electric vehicle (BEV) and a plug-in hybrid electric vehicle (PHEV).

Another electrified vehicle according to a non-limiting aspect of the present disclosure includes, among other things, a charging port including a lock, an electrical harness electrically coupled to the charging port, a battery assembly electrically coupled to the charging port by the electrical harness, and a manual release cable connected to the lock and routed along an exterior of the electrical harness. The manual release cable includes a first end connected to the lock and a second end connected to a handle.

In a further non-limiting embodiment of the foregoing electrified vehicle, the handle is provided under a hood of the electrified vehicle.

In a further non-limiting embodiment of any of the foregoing electrified vehicles, the manual release cable is connected to the exterior of the electrical harness by way of at least one fastener.

A method according to an exemplary aspect of the present disclosure includes, among other things, releasing a lock of a charging port of an electrified vehicle by pulling a manual release cable. The manual release cable is routed at least partially within an electrical harness electrically coupled to the charging port.

In a further non-limiting embodiment of the foregoing method, the manual release cable includes a first end connected to the lock and a second end connected to a handle, and the step of releasing the lock includes pulling the handle.

In a further non-limiting embodiment of any of the foregoing methods, the handle is provided under a hood of the electrified vehicle.

In a further non-limiting embodiment of any of the foregoing methods, the electrical harness includes at least one electrical wire within a housing, and the manual release cable is at least partially provided within the housing of the electrical harness.

In a further non-limiting embodiment of any of the foregoing methods, the lock includes an actuator configured to move a pin between a lock position and a release position when the lock is in a normal operating condition, and the step of releasing the lock includes moving the pin to the release position when the lock is in a stuck on plug condition.

DETAILED DESCRIPTION

This disclosure relates to a manual release for a charging port of an electrified vehicle, and also relates to a method of using the same. In this disclosure, the electrified vehicle includes a charging port having a lock. The electrified vehicle further includes a manual release cable connected to the lock and routed along an electrical harness. The electrical harness electrically couples the charging port to a battery assembly. Routing the manual release cable along the electrical harness increases the ease of assembly and provides a handle of the manual release cable in a convenient, easily-accessed location.

Figure 1:
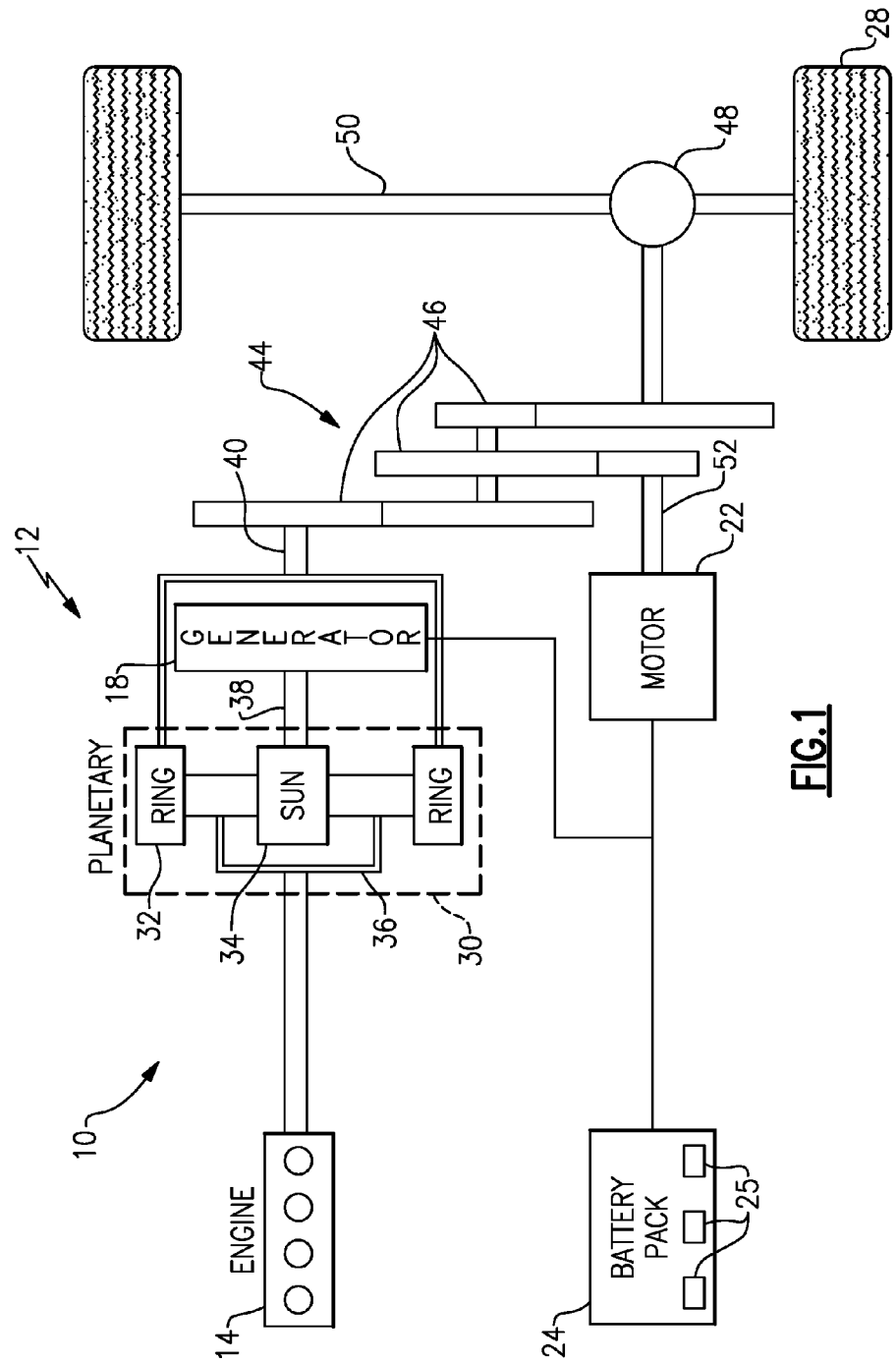
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
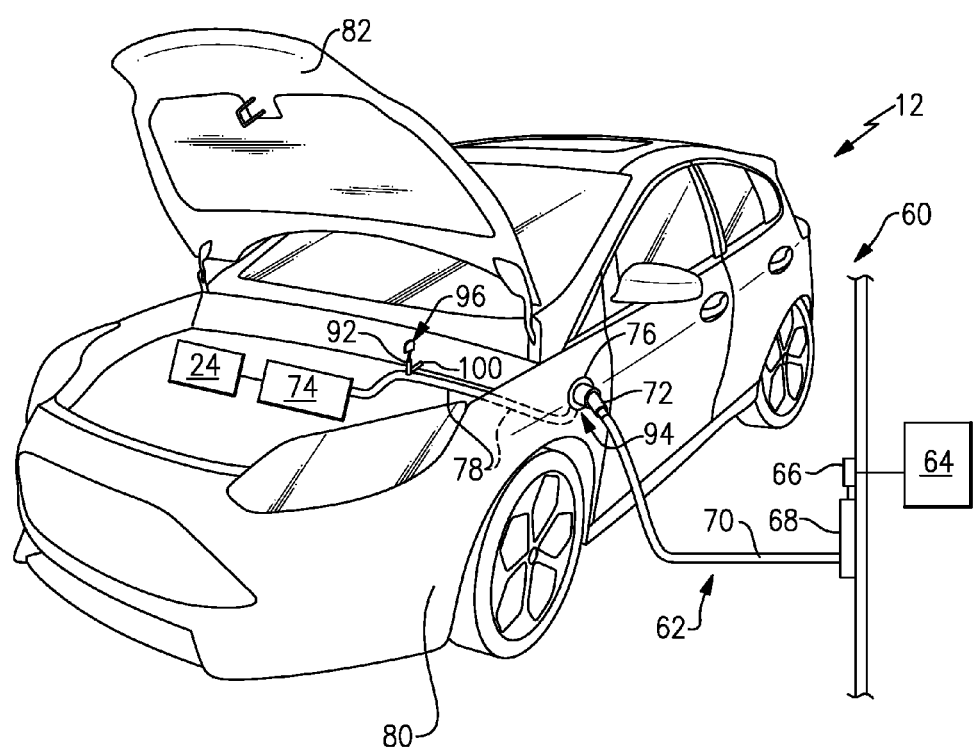
FIG. 2 illustrates an example electrified vehicle incorporating the powertrain of FIG. 1, and further incorporating a manual release for a charging port lock.

FIG. 2 illustrates an example electrified vehicle 12, which may incorporate the powertrain 10 of FIG. 1. In FIG. 2, the electrified vehicle 12 is a plug-in hybrid electric vehicle (PHEV). This disclosure extends to other types of electrified vehicles, however. The electrified vehicle 12 is shown in a charging position in which the electrified vehicle 12 is electrically coupled to a charging station 60.

The charging station 60 includes a tether-type charger assembly 62 and a grid power source 64. The charger assembly 62 conveys power from the grid power source 64 to the electrified vehicle 12. In this example, the charger assembly 62 includes a wall outlet plug 66, a charger body 68 within a housing, a charger cable 70, and a vehicle charger plug 72.

Charging the electrified vehicle 12 using the charging station 60 involves positioning the electrified vehicle 12 near the charging station 60 and electrically coupling the vehicle charger plug 72 to the electrified vehicle 12. Power can then move from the grid power source 64 to the electrified vehicle 12, and specifically battery assembly 24 of the powertrain 10. The battery assembly 24 can be charged when the electrified vehicle 12 is in the charging position.

In this example, the battery assembly 24 is electrically coupled to the grid power source 64 by way of a vehicle-mounted charger 74. The vehicle-mounted charger 74 converts incoming AC current to DC current. The vehicle-mounted charger 74 is not present in all examples. Alternatively, in some examples, the vehicle-mounted charger 74 is incorporated into the battery assembly 24 or charging station 60.

The vehicle 12 includes a charging port 76 configured to receive the vehicle charger plug 72. The charging port 76 electrically couples the vehicle charger plug 72 to the vehicle-mounted charger 74, if present, or directly to the battery assembly 24 via an electrical harness 78. In this example, the electrical harness 78 is routed through the vehicle body 80 and under a hood 82 of the vehicle, where the battery assembly 24 and vehicle-mounted charger 74 are located. As used herein, the vehicle body 80 refers to the paneling and frame of the vehicle 12.

It is sometimes desirable to lock the vehicle charger plug 72 to the charging port 76 during charging to prevent theft of the vehicle charger plug 72, and unintended separation of the vehicle charger plug 72 from charging circuits while the vehicle is charging. In some geographic regions, regulations may require that the vehicle charger plug 72 locks to the charging port 76 during charging.

Figure 3:
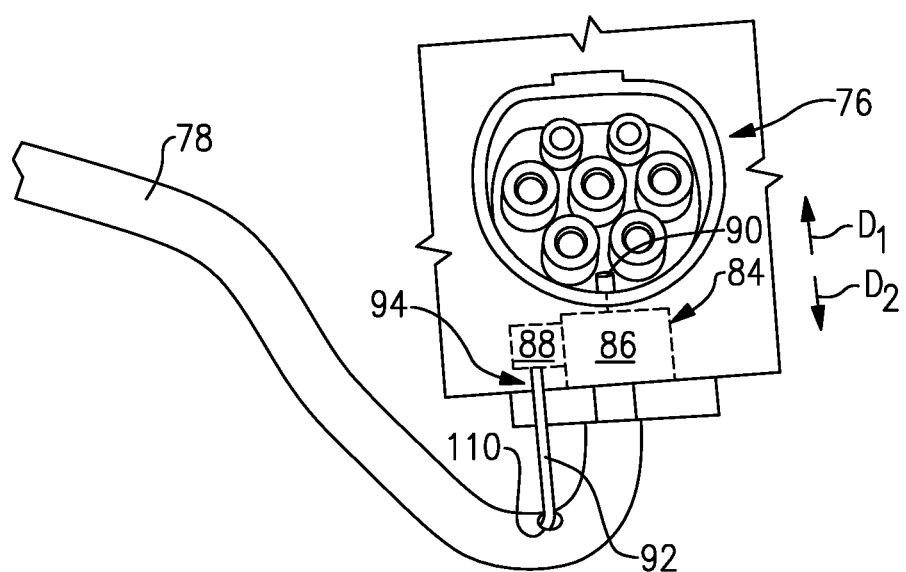
FIG. 3 illustrates the detail of an example charging port for the vehicle of FIG. 2.

FIG. 3 illustrates the charging port 76 in detail. In this example, the charging port 76 includes a lock 84 configured to selectively lock the vehicle charger plug 72 to the charging port 76. The lock 84 in this example includes an actuator 86 and a manual release 88, both of which are illustrated schematically. The actuator 86 is configured to move a pin 90 in directions $D_1$, $D_2$ between a lock position and a release position when the lock is in a normal operating condition.

In FIG. 3, the pin 90 has been moved in direction $D_1$ to a lock position, in which the pin 90 is configured to project into a corresponding recess of the vehicle charger plug 72, thereby locking the vehicle charger plug 72 to the charging port 76. In the release position, the actuator 86 is configured to move the pin 90 in the direction $D_2$ out of the recess in the vehicle charger plug 72, which allows a user to detach the vehicle charger plug 72 from the charging port 76. The actuator 86 may be programmed to move the pin 90 between the lock and release positions upon actuation of a button adjacent the charging port 76, in one example. The actuator 86 may be responsive to other commands and instructions from the vehicle 12 in other examples.

While only one pin 90 is illustrated, it should be understood that the lock 84 could include additional pins. Further, this disclosure is not limited to the particular location of the pin 90. The lock 84 could include pins placed elsewhere around the charging port 76.

In some scenarios, it is possible for the lock 84 to essentially become stuck in the lock position, which is sometimes referred to as the vehicle being "stuck on plug." In the "stuck on plug" condition, the actuator 86 is at least momentarily incapable of moving the pin 90 in the direction $D_2$ to the release position. The manual release 88 is configured to manually move the pin 90 in the direction $D_2$ in such a condition.

While the actuator 86 and manual release 88 are illustrated schematically in FIG. 3, it should be understood that this disclosure extends to all types of actuators and manual releases. The actuator 86, for example, can include a motor and one or more gears and links, and can be responsive to instructions from a controller, such as a vehicle system controller (VSC). The manual release 88 may include one or more links configured to essentially override the actuator 86 and move the pin 90 in the direction $D_2$ to the release position.

The manual release 88 is activated manually under force exerted by a user, in this example. This disclosure provides a manual release cable 92 connected to the lock 84 and routed along the electrical harness 78. In particular, the manual release cable 92 is connected directly to the manual release 88 at a first end 94, and a second end 96 (FIG. 2) of the manual release cable 92 is accessible by a user under the hood 82 of the vehicle 12.

In one example of this disclosure, the manual release cable 92 includes a cable provided within a housing. The cable is moveable within the housing to transmit mechanical force between the first end 94 and the second end 96 of the manual release cable 92. In one example, the manual release cable 92 is a Bowden cable.

The manual release cable 92 is routed along the electrical harness 78 in such a way that the two components provide a single assembly. Thus, a manufacturer can deliver a single assembly, which includes both the manual release cable 92 and the electrical harness 78, to an assembly plant. An assembly worker can install the assembly as part of a single operational step. Further, as will be described below, the manual release cable 92 is arranged such that it is easily accessed by a user under the hood 82 of the vehicle 12.

Figure 4:
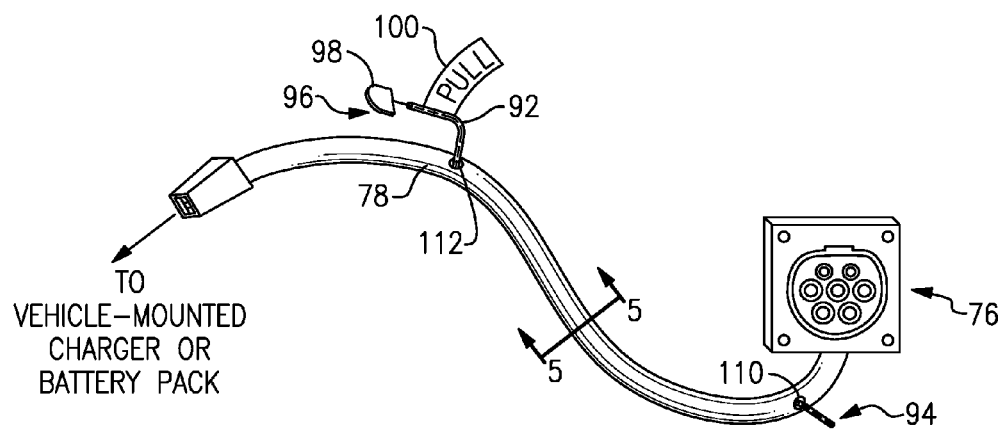
FIG. 4 illustrates a first arrangement of an electrical harness and manual release cable.

With joint reference to FIGS. 2 and 4, the manual release cable 92 includes a handle 98 at the second end 96 in this example. The handle 98 is configured to receive a user's hand or finger. In one example, the handle 98 is a loop. In another example, the handle 98 resembles a ripcord handle. This disclosure extends to other types of handles, however. In order to activate the manual release 88, a user grabs hold of the handle 98 and exerts a pulling force on the handle 98. An identifying tag 100 with a phrase such as "PULL" may be provided on the manual release cable 92 adjacent the handle 98.

FIG. 4 illustrates the charging port 76, electrical harness 78, and manual release cable 92 without the remainder of the vehicle 12 for ease of reference. In the embodiment of FIG. 4, the manual release cable 92 is routed within at least a portion of the electrical harness 78.

Figure 5:
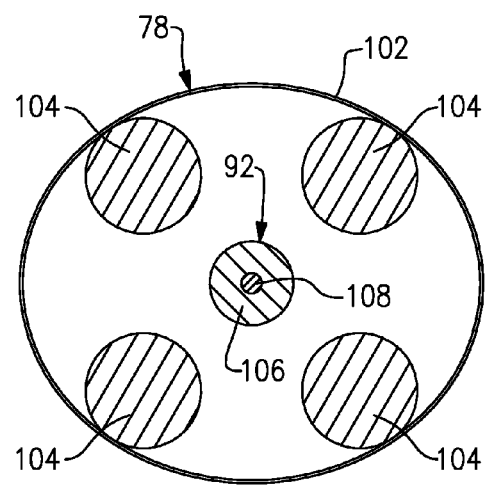
FIG. 5 is a cross-sectional view taken along line 5-5 in FIG. 4.

FIG. 5 is a cross-sectional view of the electrical harness 78. In FIG. 5, the electrical harness 78 includes a housing 102 and a plurality of electrical wires 104 electrically coupled between the charging port 76 and the vehicle-mounted charger 74 (if present) and battery assembly 24. The manual release cable 92 includes a housing 106 and a cable 108 disposed within the housing 106. As mentioned above, the cable 108 is moveable relative to the housing 106 to transmit mechanical force.

In the embodiment of FIG. 4, the housing 102 of the electrical harness 78 includes a first port 110 adjacent the charging port 76 and a second port 112 adjacent the vehicle-mounted charger 74 (if present) and the battery assembly 24. The first and second ports 110, 112 are openings in the housing 102 of the electrical harness 78 that allow the first and second ends 94, 96 of the manual release cable 92 to project outward for attachment to the manual release 88 and the handle 98, respectively. As shown in FIG. 4, substantially the entire length of the manual release cable 92 is routed within the housing 102 of the electrical harness 78 in this example. Embedding at least a portion of the manual release cable 92 in the electrical harness 78 increases the ease of assembling the vehicle 12 and provides the handle 98 in a convenient and accessible location under the hood 82.

Figure 6:
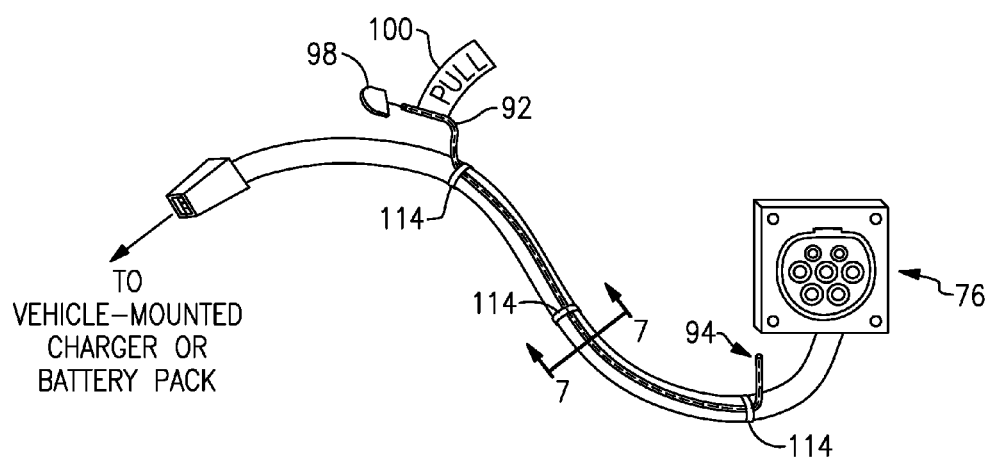
FIG. 6 illustrates a second arrangement of an electrical harness and manual release cable.
Figure 7:
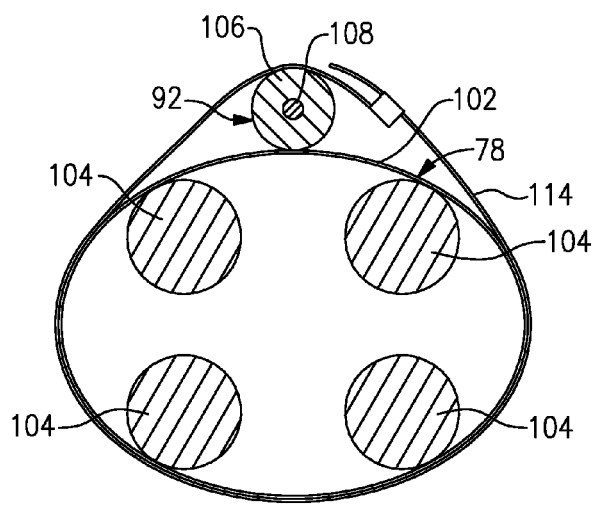
FIG. 7 is a cross-sectional view taken along line 7-7 in FIG. 6.

In another embodiment, shown in FIG. 6, the manual release cable 92 is attached to the exterior surface, which is provided by the housing 102, of the electrical harness 78 by a fastener. In FIG. 6, there are three such fasteners 114 spaced-apart from one another along the length of the electrical harness 78. FIG. 7 is a cross-sectional view illustrating the manual release cable 92 attached to the housing 102 by the fasteners 114. In the embodiment of FIGS. 6-7, the fasteners 114 are cable ties (less formally known as zip ties). This disclosure is not limited to a particular fastener type, however.

This disclosure provides a combination electrical harness-manual release cable assembly, which reduces the number of parts for assembly in the vehicle. Thus, the ease of vehicle assembly is increased. Both embodiments of the present disclosure arrange the handle 98 of the manual release cable 92 in an easily-accessed location under the hood 82 of the vehicle 12, which allows users to activate the manual release 88 themselves, without requiring special tools, and without needing to call roadside assistance.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
a charging port including a lock;
an electrical harness electrically coupled to the charging port;
a battery assembly electrically coupled to the charging port by the electrical harness; and
a manual release cable connected to the lock and routed at least partially within the electrical harness.

2. The electrified vehicle as recited in claim 1, wherein the lock includes an actuator and a manual release, and wherein the manual release cable is connected to the manual release.

3. The electrified vehicle as recited in claim 2, wherein:
the actuator is configured to move a pin between a lock position and a release position when the lock is in a normal operating condition, and
the manual release is configured to move the pin to the release position when the lock is in a stuck on plug condition.

4. The electrified vehicle as recited in claim 1, wherein the manual release cable includes a first end connected to the lock and a second end connected to a handle.

5. The electrified vehicle as recited in claim 4, wherein the handle is provided under a hood of the electrified vehicle.

6. The electrified vehicle as recited in claim 5, wherein the manual release cable includes an identifying tag adjacent the handle.

7. The electrified vehicle as recited in claim 4, wherein the handle includes a loop.

8. The electrified vehicle as recited in claim 1, wherein the manual release cable includes a cable within a housing, the cable moveable relative to the housing to transmit mechanical force.

9. The electrified vehicle as recited in claim 8, wherein the electrical harness includes at least one electrical wire within a housing, and wherein the manual release cable is at least partially provided within the housing of the electrical harness.

10. The electrified vehicle as recited in claim 9, wherein:
the housing of the electrical harness includes a first port adjacent the charging port and a second port adjacent the battery assembly,
a first end of the manual release cable projects from the first port, and
a second end of the manual release cable projects from the second port.

11. The electrified vehicle as recited in claim 1, further comprising a charger electrically coupled to the battery assembly, the electrical harness electrically coupling the charging port to the charger.

12. The electrified vehicle as recited in claim 1, wherein the electrified vehicle is one of a battery electric vehicle (BEV) and a plug-in hybrid electric vehicle (PHEV).

13. An electrified vehicle, comprising:
a charging port including a lock;
an electrical harness electrically coupled to the charging port;
a battery assembly electrically coupled to the charging port by the electrical harness; and
a manual release cable connected to the lock and routed along an exterior of the electrical harness, wherein the manual release cable includes a first end connected to the lock and a second end connected to a handle.

14. The electrified vehicle as recited in claim 13, wherein the handle is provided under a hood of the electrified vehicle.

15. The electrified vehicle as recited in claim 13, wherein the manual release cable is connected to the exterior of the electrical harness by way of at least one fastener.

16. A method, comprising:
releasing a lock of a charging port of an electrified vehicle by pulling a manual release cable, the manual release cable routed at least partially within an electrical harness electrically coupled to the charging port.

17. The method as recited in claim 16, wherein:
the manual release cable includes a first end connected to the lock and a second end connected to a handle, and
the step of releasing the lock includes pulling the handle.

18. The method recited in claim 17, wherein the handle is provided under a hood of the electrified vehicle.

19. The method as recited in claim 16, wherein the electrical harness includes at least one electrical wire within a housing, and wherein the manual release cable is at least partially provided within the housing of the electrical harness.

20. The method as recited in claim 16, wherein the lock includes an actuator configured to move a pin between a lock position and a release position when the lock is in a normal operating condition, and wherein the step of releasing the lock includes moving the pin to the release position when the lock is in a stuck on plug condition.

* * * * *